United States Patent [19]

Escher et al.

[11] 4,417,937

[45] Nov. 29, 1983

[54] FIBRE REINFORCED PLASTIC STRUCTURES AND METHOD AND APPARATUS FOR PRODUCING SAME

[75] Inventors: Giorgio A. Escher, Mahone Bay; Raymond C. Dahn, Lunenburg, both of Canada

[73] Assignee: Atlantic Bridge Company Limited, Nova Scotia, Canada

[21] Appl. No.: 396,591

[22] Filed: Jul. 9, 1982

Related U.S. Application Data

[63] Continuation-in-part of Ser. No. 183,067, Sep. 2, 1980, abandoned, which is a continuation of Ser. No. 9,804, Feb. 6, 1979, abandoned.

[30] Foreign Application Priority Data

Feb. 23, 1978 [CA] Canada .................................. 297587

[51] Int. Cl.³ .......................................... B65H 81/00
[52] U.S. Cl. .................................... 156/169; 156/173; 156/174; 156/175; 156/425; 156/428; 428/294
[58] Field of Search ............... 156/169, 172, 173, 174, 156/175, 143, 425, 428; 428/294

[56] References Cited

U.S. PATENT DOCUMENTS 2,862,541 12/1958 Brink .................................... 156/172
4,089,719 5/1978 Sundell ................................ 156/171

FOREIGN PATENT DOCUMENTS 576345 5/1959 Canada .
877114 8/1971 Canada .
989091 4/1965 United Kingdom .
1157936 7/1969 United Kingdom .
1206394 9/1970 United Kingdom .

Primary Examiner—Marion McCamish
Attorney, Agent, or Firm—Cushman, Darby & Cushman

[57] ABSTRACT

Forces are applied to cut fibres in a prescribed fashion to cause them to move in a predetermined manner toward and to be deposited on a mould surface in a controlled oriented fashion.

21 Claims, 21 Drawing Figures

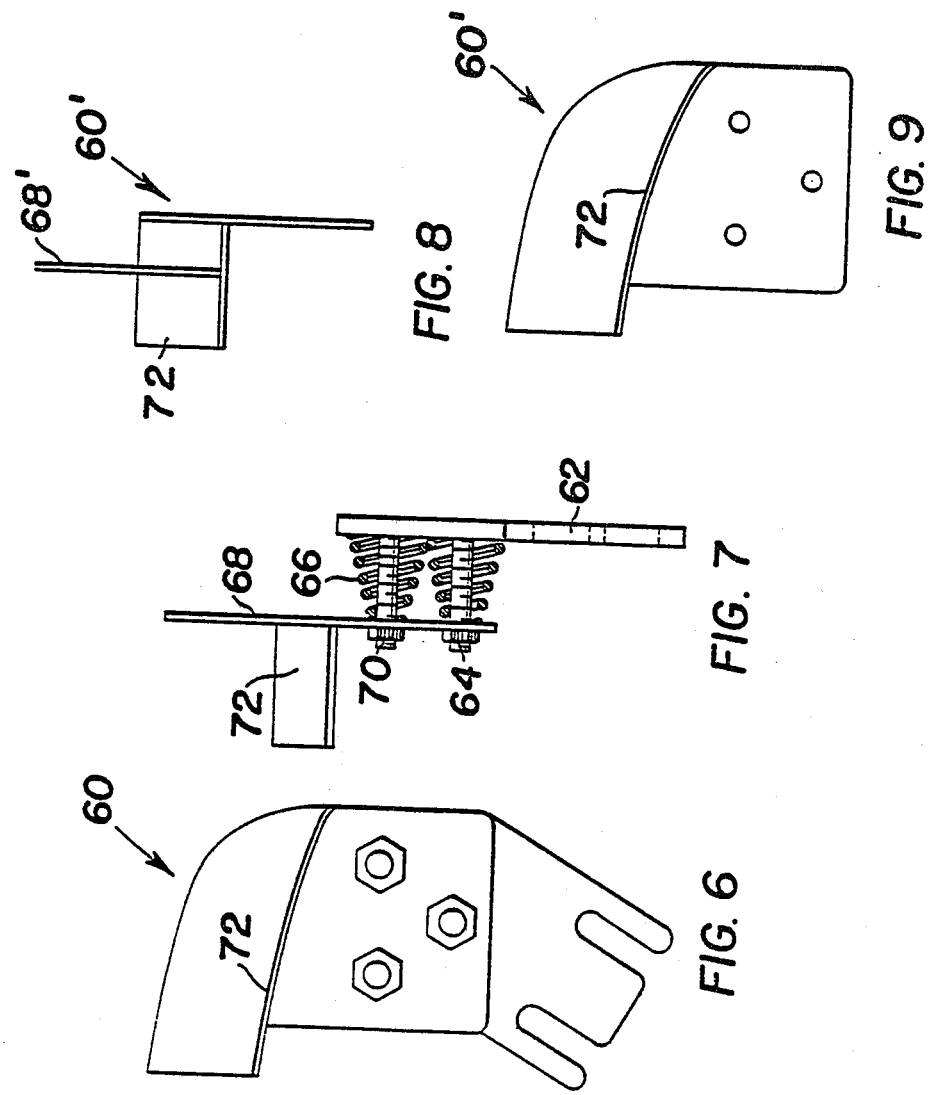

FIBRE REINFORCED PLASTIC STRUCTURES AND METHOD AND APPARATUS FOR PRODUCING SAME

CROSS-REFERENCE TO RELATED APPLICATIONS

This is a continuation-in-part of U.S. Application Ser. No. 183,067 filed Sept. 2nd, 1980 (now abandoned) which, in turn, is a continuation of U.S. Application Ser. No. 009,804 filed Feb. 6, 1979 (now abandoned).

BACKGROUND OF THE INVENTION

This invention relates to fibre reinforced plastic structures and improved methods and apparatus for producing same.

Fibre reinforced plastic materials are currently finding wide application in the production of various structures such as panels, hoods, doors, tanks, boats and pipes which require such features as corrosion resistance and a high strength to weight ratio. Such structures are generally formed by placing resin coated high tensile strength filaments or fibres on suitable moulds or mandrels, and subsequently curing the resin and removing the fibre reinforced plastic part.

Various methods for providing reinforcement in desired regions of the structure are employed including using woven high strength fabric sheets, laying high strength filaments either as individual filaments or as sheets of filaments in the desired plane of high strength. The method of laying filaments as individual filaments in the desired plane of high strength involves taking continuous strand fiberglass, cutting it to a length and laying it by hand along the areas requiring high strength glass. This can be done from continuous strand glass which consists of gathered filaments wound into a cylindrical package. Another form of this continuous strand material is where many sets of gathered filaments are held together with small amounts of cross-wise stitching and this gathered multiple strand material is cut to length and laid in the described plane of high strength by hand to provide a reinforcement in the desired regions of the structure. Other methods include the incorporation of chopped, randomly oriented fibres into the laminate construction, and helically winding and/or hoop winding filaments, tapes or mats to form cylindrical wall structures. Woven, high strength fabric sheets are also commonly used as reinforcement.

Woven fabric sheet reinforcement is quite expensive as it can be difficult to apply to complex shapes and can also be quite wasteful in that it provides two directional lines of strength even where uni-directional strength might only be needed. The use of high strength filaments either as individual filaments or sheets of filaments produces relatively good products but again fabrication tends to be complex and expensive. The use of random oriented chopped rovings is generally economical in respect to labour requirements but can be both costly and inefficient in those areas where high strength is needed in certain planes of stress as excessive random fibre deposition is required in order to obtain sufficient amounts of high strength filaments in those planes.

With particular reference to the manufacture of hollow bodies such as pipe, hollow poles etc., it is noted that the majority of fibre reinforced plastic piping made at the present time is produced by a filament winding process in which continuous glass fibres are impregnated with resin and applied in a helical pattern on a rotating mandrel. The fibres are deposited by a carriage which moves back and forth along the length of the mandrel. A pipe made by this process has excellent resistance to internal pressure but suffers from severe structural and economic drawbacks. For example, as a result of the helical structure of the glass reinforcement, the longitudinal strength of the pipe is low compared with the strength in other directions. Typically, the longitudinal strength in a bending test is in the order of only 6000 pounds per square inch while the ultimate hoop strength under hydrostatic pressures is in the order of 60,000 pounds per square inch,—a ten fold difference. When reinforced plastics pipe of this nature is supported from hangers, these have to be spaced much closer together than is needed with metal pipes which imposes a heavy cost factor and often a severe engineering inconvenience. In addition to this, at the two ends of the mandrel, where the direction of the lay of glass fibres is reversed, the helical pattern is distorted and an irregular build-up of material occurs which has to be discarded. The loss of material thus incurred varies between 5% and 20% depending on the diameter and length of pipe and on the angle of winding.

It is evident that the first drawback noted above, i.e. longitudinal weakness, can be substantially overcome by incorporating longitudinal reinforcement in the pipe wall. Three principal processes are used at present to achieve this. The first process, of an intermittent nature, involves a carriage which travels back and forth along a mandrel whose rotation is temporarily stopped and which deposits glass fibres in the longitudinal direction. After each longitudinal layer is deposited, a layer is applied in the hoop direction with the mandrel in rotation. This process has the same drawbacks as the helical winding system in that it involves substantial end losses, handling losses, involves costly large mandrels and it is furthermore mechanically complex and provides only a relatively low production rate. A still further process involves the use of a paper core which is continuously produced and then covered by alternating layers of continuous longitudinal fibres and hoop wound fibres. Its main drawbacks are the necessity of building a paper core of adequate strength which subsequently has to be removed and discarded together with its limitation to relatively small diameters (about 12" maximum) because of the enormous number of longitudinal fibres required in large diameter pipes. A still further and somewhat more successful process provides longitudinal reinforcement by providing a carrier type having transversely oriented parallel cut fibres secured thereto. The carrier tape is then wrapped in a near circumferential spiral on a revolving cylindrical mandrel with the turns of tape being in partially overlapping relation thereby to provide the desired longitudinal reinforcement. One of the principal drawbacks of this process is the need for a carrier tape, the production of which involves a separate manufacturing step.

SUMMARY OF THE INVENTION

It is a principal object of the present invention to alleviate the disadvantages inherent in the prior art process by providing a method and an apparatus capable of cutting continuous fibre into lengths and then depositing same on a mould surface in a specific and controlled orientation. It is a further object to provide a method of this nature which is suitable for continuous production and at a relatively high rate of production. It is a further object to provide a method and apparatus for depositing oriented fibres without the need for carrier tapes or the like. The longitudinal reinforcement can be incorporated to any desired degree and end losses, in the case of pipes produced on winding mandrels, are much smaller than in conventional helical winding processes.

Thus, in accordance with the invention in one aspect there is provided a method of applying fibre reinforcing material to a mould surface, said method comprising: passing a strand of continuous length fibre through a cutting device to cut the strand into generally uniform length cut fibres; directing cut fibres endwise away from the cutting device along an initial path of travel; applying a force at a predetermined location along the length of the individual cut fibres to cause the individual cut fibres to deviate from the initial path of travel and to assume a selected motion pattern, and positioning a mould surface so as to intercept the moving cut fibres at a selected phase of the motion pattern to achieve a predetermined orientation of the cut fibres on the mould surface.

The above noted force may be applied to the cut fibres adjacent end portions thereof thereby to cause them to assume the selected motion pattern.

The force may be applied in various ways as by contacting the cut fibre with a moving contact element.

In a further aspect of the invention, said force is applied to the cut fibre in such manner as to cause the cut fibre to rotate about an axis transverse to its length as it moves toward the mould surface. The fibres are laid down in generally parallel orientation to one another.

In a preferred form of the invention, the continuous length fibres pass through the nip defined between a bladed cutter roll and a pinch roll contacting the same to cut the fibres into uniform lengths. The initial path of travel of the fibres is along a line tangent to the contacting surfaces of the cutter and pinch rolls in the nip. The contact element is moved in a circular path centered at the rotation axis of the cutter roll and in synchronism with the rotation of the cutter roll.

In one form of the invention the cut fibres rotate about their mid length portions in such fashion that if not intercepted by a mould they would rotate end over end in flight through a series of spaced parallel positions. The step of positioning the mould surface comprises locating the mould surface at and in generally parallel relation to one of said parallel positions whereby the cut fibres are intercepted by and deposited on the mould surface in generally parallel orientation relative to one another. Thus, by effecting relative movement between the mould surface and the cutter arrangement in suitable direction, a layer or layers of parallel oriented cut fibres can be laid down.

In another form of the invention the fibre is under some form of contact with the apparatus during the entire path of travel from the cutting device to the mould.

In the production of hollow bodies such as pipes, the mould surface is defined by a mandrel of circular or polygonal cross-section. Uncured resin may be applied to the mould surface, or alternatively, a layer or layers of resin coated hoop wound filaments, with the mandrel being rotated about its axis, with such axis being parallel to the parallel fibres being deposited thereon thereby to build up an annular layer of oriented fibres on the mandrel surface. Relative motion is effected between the cutting device and the mandrel along the rotation axis of the mandrel to apply a plurality of overlapping convulutions of oriented fibres on the mandrel. Additional layers of resin impregnated hoop-wound filaments or helically wound filaments may be applied to the mandrel as well as additional layers of longitudinally oriented fibres thereby to build up a wall of the required thickness and having the desired ratio of longitudinal to hoop strength.

In accordance with a further feature of the invention, provision can be made for applying both oriented cut fibre and randomly oriented cut fibre to the mould surface. In order to accomplish this, a further strand or strands of continuous length fibre are passed through the cutting device along with the first mentioned strand, with the above-noted forces being applied only to the individual cut fibres of the first mentioned strand whereby the cut fibres of the further strand assume random flight patterns and thus are deposited on the mould surface in random orientation.

In accordance with a further aspect of the invention, there is provided an apparatus for applying fibre reinforcing material to a mould surface comprising: means including a cutting device for cutting a strand of continuous length fibres into lengths and directing cut fibres endwise away from the cutting device along an initial path of travel; and means for applying a force at a predetermined location along the length of the individual cut fibres to cause them to deviate from the initial path of travel and to assume a selected motion pattern, whereby a mould surface may be positioned so as to intercept the moving cut fibres at a selected phase of the motion pattern to achieve a predetermined orientation of the cut fibres on the mould surface.

In a further aspect of the invention force applying means is adapted to apply such force to the cut fibre in such manner as to cause the cut fibre to rotate about an axis transverse to its length as it moves toward the mould surface.

In one form of the invention, the force applying means may be a contact element adapted to engage each fibre in the manner noted above, e.g. at one of its opposing ends.

It is to be understood that the invention, in its broadest aspect is not limited to any one form of constant motion pattern only; many other constant motion patterns can be set up as well some of which are described herein.

In the preferred form of the invention, the cutting device comprises a bladed cutter roll and a pinch roll contacting the same to define a nip through which the continuous length fibre is passed thereby to cut the fibre into lengths. The above-noted contact element may be mounted to an arm arranged for movement in a circular path centered at the axis of the cutter roll for movement in synchronism with the rotation of the cutter roll. Thus, by selecting the length of the arm in relation to the length of the cut fibre, and by selecting the angle the arm makes with the blades of the cutter roll, one can arrange for the application of the forces to each fibre at the desired point of contact therealong.

As a further feature of the apparatus, means may be provided which cooperate with the force applying means such that the forces are applied only to a certain percentage of the individual cut fibres so that the remaining cut fibres, which are unaffected by the force applying means, are applied to the mould surface in a random orientation.

The apparatus described above may be used in conjunction with various forms of mould surfaces so long as such surfaces are positioned to intercept the moving fibres as described previously. In the case of the manufacture of hollow bodies such as pipe, the rotating mandrel is used with a layer of longitudinally oriented fibres being built up thereon as described above.

Fibre reinforced plastics products made by the technique described herein comprise a plurality of fibrous strands embedded in a matrix of plastics material, the fibrous strands being in the form of cut fibre lengths lying essentially parallel to one another. The product is characterized in that adjacent cut lengths of fibres are devoid of any interconnecting filaments extending therebetween, the interconnections between the cut fibre lengths being provided solely by the matrix of plastics material. This feature serves to distinguish the product over other forms of products having oriented fibres therein wherein such fibres are, in part, secured together by some form of interconnecting means such as a tape or transversely extending filaments. In the case of a pipe, the cut fibre lengths are disposed in the pipe wall in parallelism or at a small angle to the longitudinal axis of the pipe with the ends of the adjacent fibres being in overlapping relation. In addition to the longitudinally oriented filaments, the pipe may include one or more layers of hoop wound or helically would filaments and may also include randomly oriented filaments distributed in the matrix thereby to provide the pipe with the required degree of strength in all planes of significance.

BRIEF DESCRIPTION OF THE DRAWINGS

A preferred embodiment of the invention will now be described by way of example with reference to the drawings wherein:

FIGS. 6 and 7 are side and end elevation views respectively of a chute assembly for guiding and directing cut fibres;

FIGS. 8 and 9 are end and side elevation views respectively of a modified form of chute arrangement used when only a portion of the cut fibres are to be oriented;

DETAILED DESCRIPTION OF A PREFERRED EMBODIMENT

Figure 1:
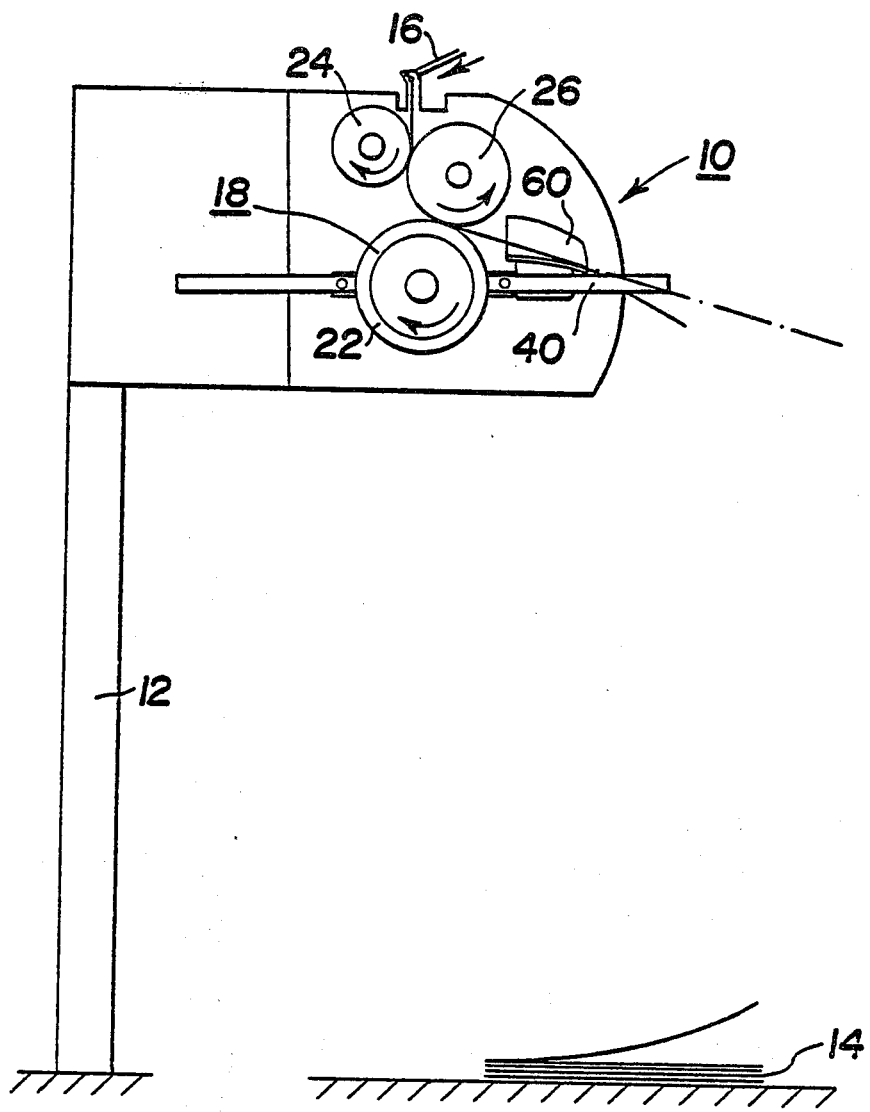
FIG. 1 is a diagrammatic illustration of apparatus for cutting and applying fibre reinforcing material to a mould surface.

With reference now to the drawings, there is shown a fibre cutting and orienting head 10 mounted to a suitable support arrangement 12 and disposed a preselected distance above a mould surface 14. The head assembly 10 receives one or more strands of continuous length fibre 16 from a supply source (not shown). The fibre is cut into uniform length by a cutter assembly 18. A force is applied to each cut fibre at a predetermined location along its length shortly after it emerges from the cutter assembly thereby to cause the fibre to assume a selected repeated motion pattern in flight. The mould surface 14 is positioned to intercept the moving cut fibres at a selected phase of the repeating motion pattern thereby to achieve the desired parallel orientation of the fibres on such surface.

The head assembly 10 is shown in greater detail in FIGS. 2-5. The head assembly includes a rigid mounting plate 20, on the face of which are mounted a cutter roll 22, and a pair of pinch rolls 24 and 26. The surface of pinch roll 26 is made of a firm resilient material such as Neoprene rubber so that it is capable of yielding slightly by virtue of its pressurized contact with pinch roll 24 and also with the cutter roll 22. Pinch roll 24 is in pressurized contact with a portion of the periphery of pinch roll 26 thereby defining a nip 28 therebetween with pinch roll 26 also being in firm pressurized contact with cutter roll 22 thereby forming a nip 30 therebetween. Pinch rolls 24 and 26 are adjustable relative to support plate 20 thereby to enable the pressures in nips 28 and 30 to be varied as desired. For example, these rolls may be provided with eccentrically arranged mounting shafts seated in mounting plate 20 thereby to provide for easy adjustment.

The cutter roll 22 is firmly keyed to a drive shaft 32, the latter extending through mounting plate 20 and being driven in rotation by a drive motor 34 mounted to the rear face of plate 20. Drive motor 34 may be of any suitable commercially available variety and, preferably, is provided with speed adjustment means (not shown) thereby to permit the speed to be adjusted over a relatively wide range, e.g. from about 200 rpm. to something over 2500 rpm.

The cutter roll 22 includes a support hub 36, upon which is mounted a rotor assembly 38. Rotor assembly 38 includes a pair of oppositely directed radially arranged striker arms 40, the opposing ends of which are bent inwardly toward mounting plate 20 thereby to define on each arm 40, a contact finger 42 disposed generally at right angles to its associated arm.

The cylindrical surface of cutter roll 22 is provided with a pair of equally spaced apart slots extending thereacross at a shallow angle with respect to the rotation axis of the cutter roll, such slots serving to seat respective cutter blades 44. The cutting edge of each cutter blade 44, extends outwardly beyond the periphery of cutter roll 22 by a short distance thereby to sever fibres coming into contact therwith in nip 30 between cutter roll 22 and pinch roll 26. The resilient surface of pinch roll 26 deforms upon contact with the cutting edges of blades 44 and the cutting action takes place in a manner generally well known in the art which need not be described further here.

Figure 2:
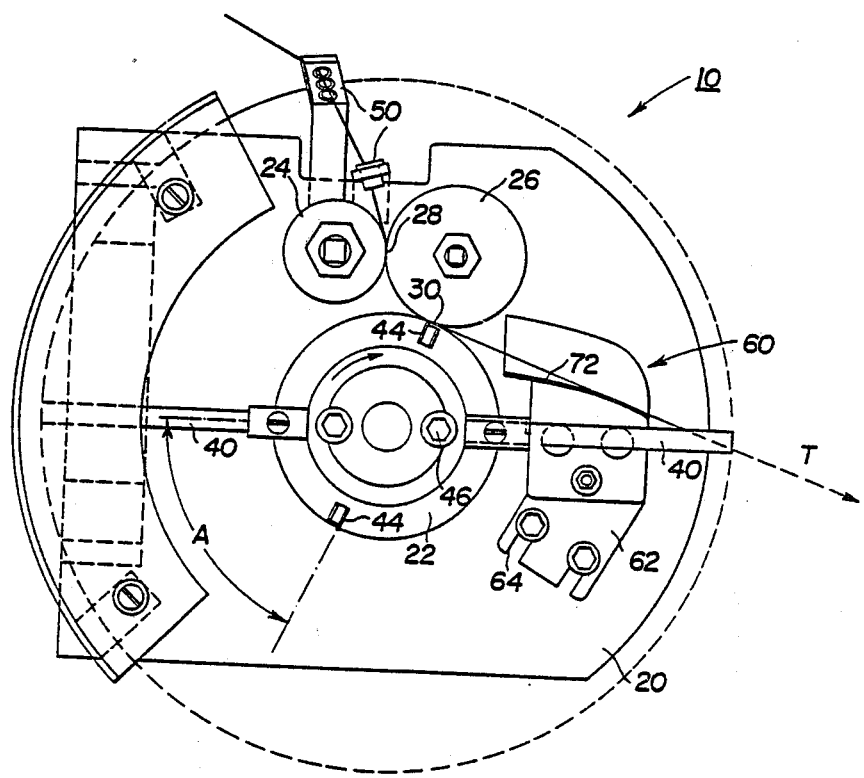
FIG. 2 is a front elevation view of the head portion of a fibre cutter and orienting device according to the invention.
Figure 3:
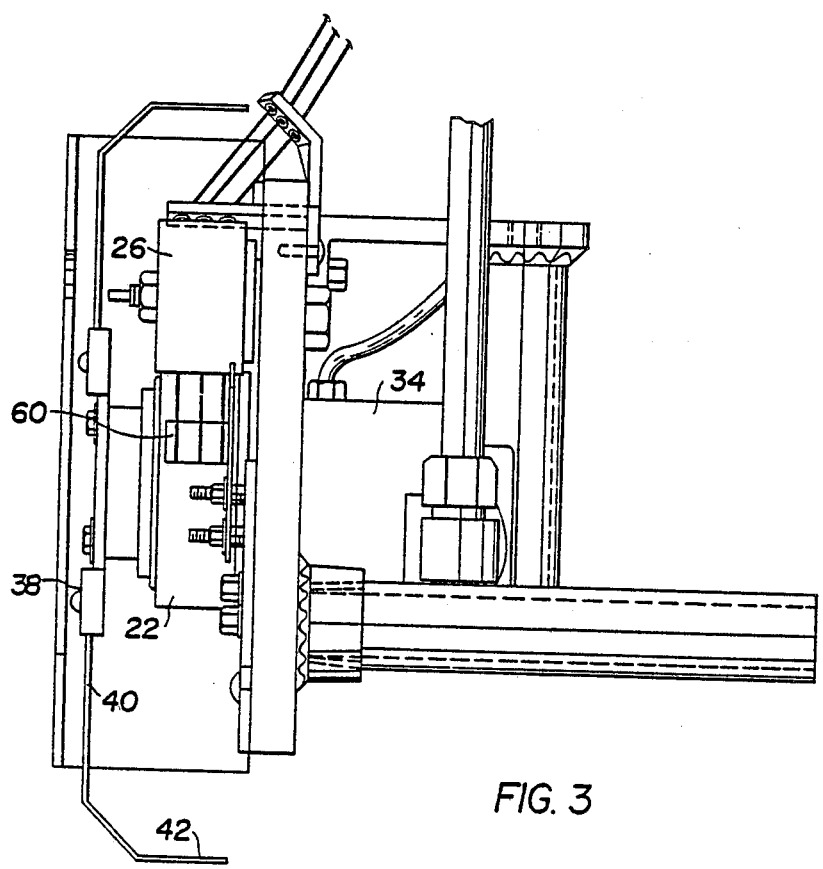
FIG. 3 is a side elevation view of the apparatus looking toward the right hand side of FIG. 2.
Figure 4:
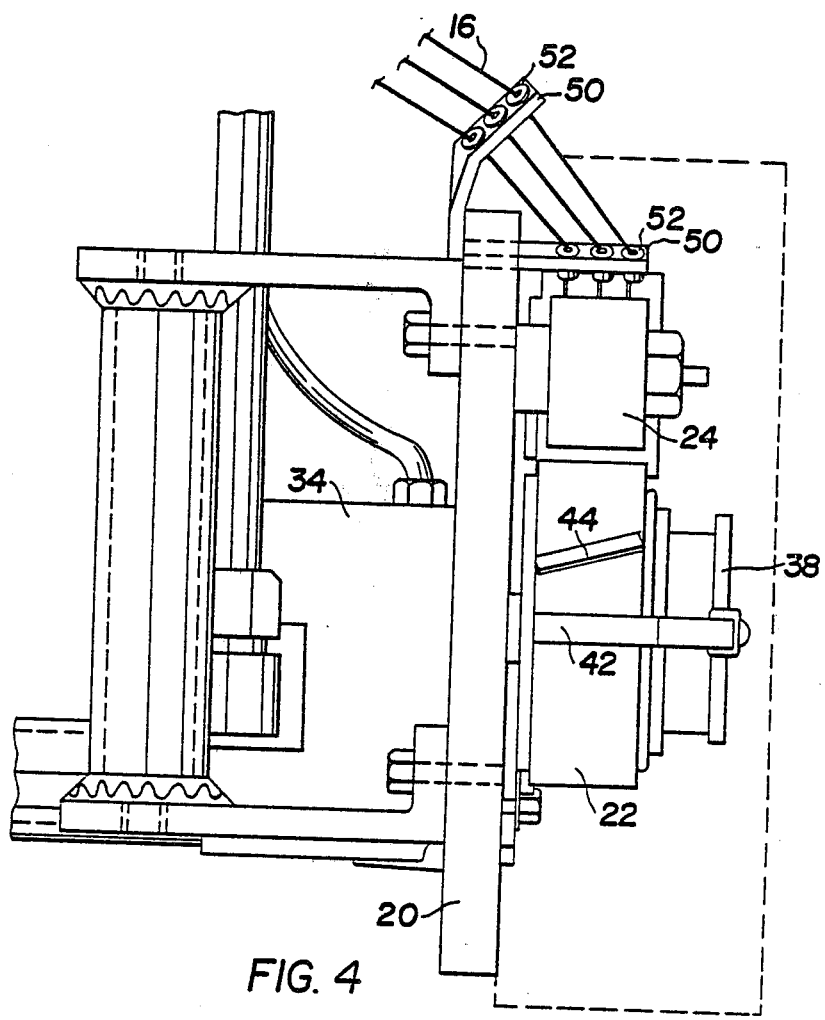
FIG. 4 is a further elevation view of the apparatus looking toward the left hand side of FIG. 2.
Figure 5:
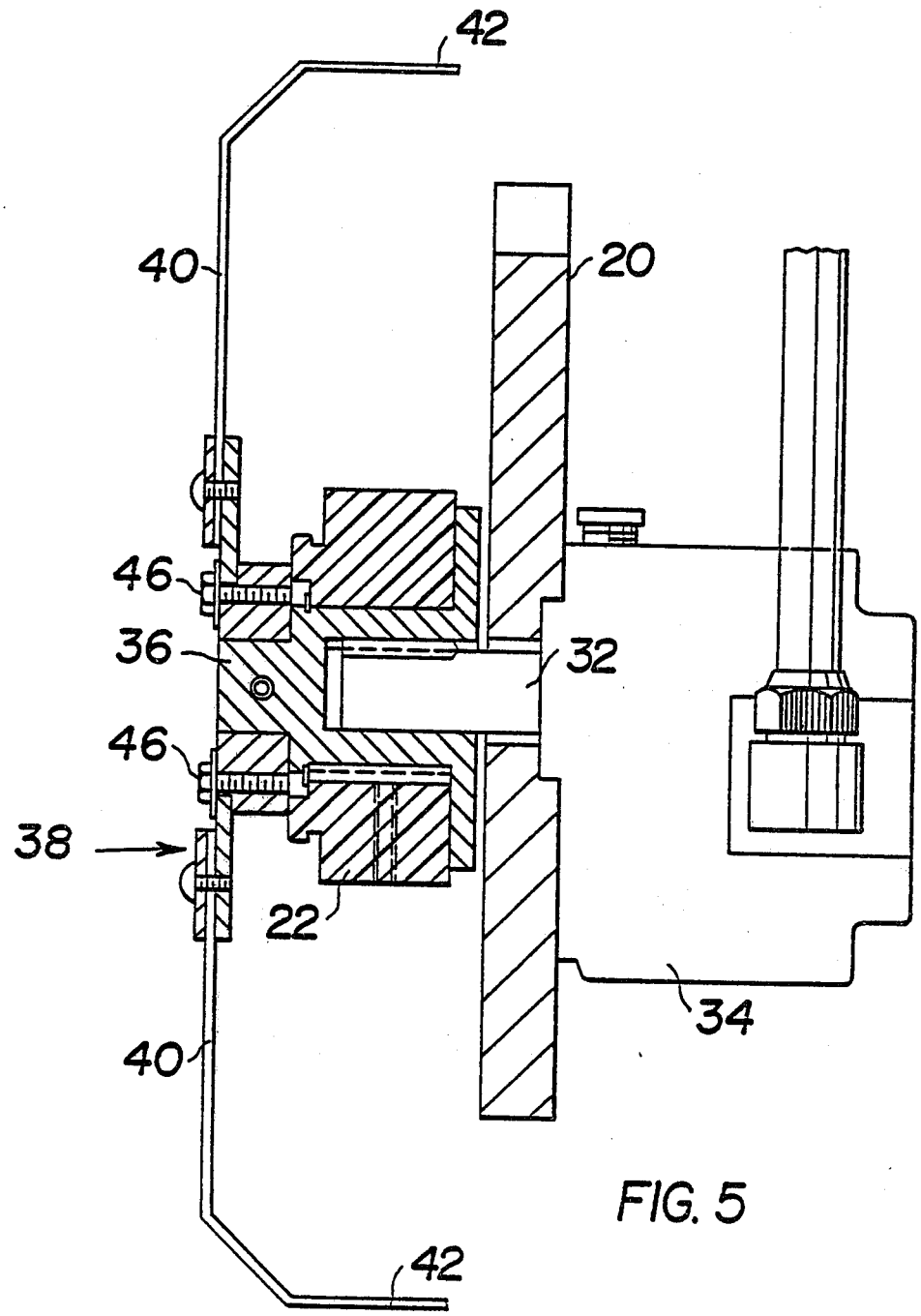
FIG. 5 is a section view (certain parts having been omitted) of the cutter wheel and rotor assembly.

It will be seen from FIG. 2 that the arms 40, are positioned from the associated cutting edges of cutter blades 44, by a suitable angle A which, in the embodiment shown, is about 60°. This angle may of course be varied depending upon requirements and the reason therefor will become more apparent hereinafter, it being sufficient to state here that this angle allows the cut fibres to move out a distance along tangent line T before the leading end of the fibre is struck by a rotating contact finger 42. The angle A can be varied by loosening studs 46 and rotating rotor assembly 38 by the desired degree relative to the mounting hub 36. The rotor assembly 38 can also be removed from mounting hub 36 and replaced with one having longer or shorter arms 40 thereby to change the radius of the path of movement of the contact fingers 42. These two adjustments i.e. the change in the angular relation between arms 40 and the cutter blades 44, and the changes in the radius of the path of movement of contact fingers 42 readily permit the operator to time the contact fingers 42 so as to obtain the desired motion pattern of the cut fibres.

In order to feed the strands of continuous fibres 16 into the apparatus, a pair of eyelet guide assemblies 50 are mounted in spaced apart relationship to the mounting plate 20, such guide assemblies each including a plurality of ceramic eyelets 52 therein and being arranged to guide the continuous strands smoothly from the supply source into the nip 28 between pinch rolls 24 and 26. The number of strands being fed into the device may, of course, be varied depending upon requirements.

The initial path of travel of the fibre passing between cutter roll 22 and pinch roll 26 is illustrated in FIG. 2 by line T. This line extends outwardly from nip 30 and is tangentially disposed relative to the contacting surfaces of the cutter and pinch rolls 22, 26, in the nip. In order to assist in guiding the fibres along this initial path of travel or "flight", a chute assembly 60 is mounted to the mounting plate 20 in a position such that the fibres can pass thereover and lightly contact same as they move along the tangent line T.

As noted previously, two different forms of chute arrangement 60 are shown in the drawings. The basic chute construction is best illustrated with reference to FIGS. 2, 6, 7 and 10; this arrangement permits directional orientation of all fibres passing through the cutting assembly while the modified arrangement illustrated in FIGS. 8, 9 and 11 permits directional orientation of a selected proportion of the cut fibres with the remaining cut fibres being ultimately deposited on the mould surface in random orientation.

Figure 10:
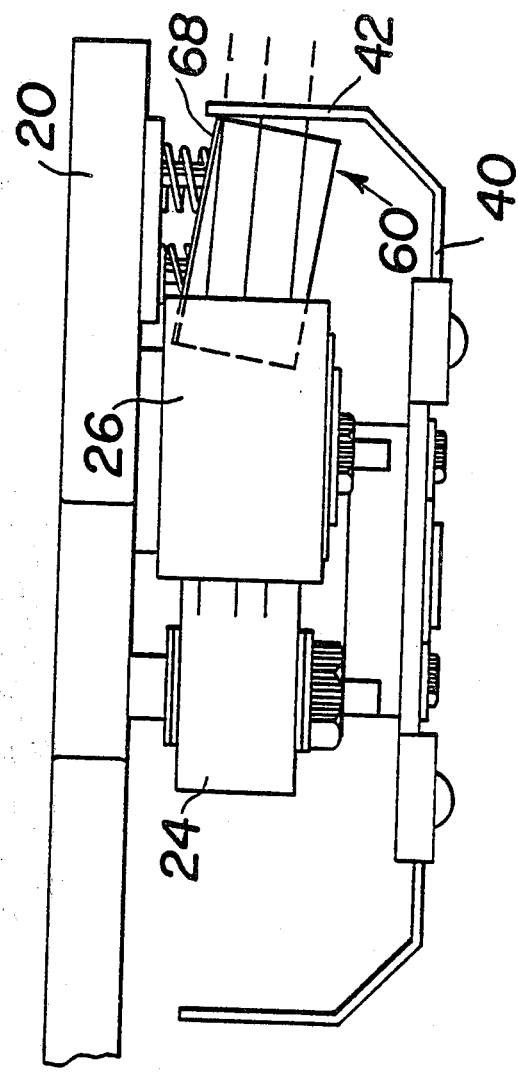
FIG. 10 is a plan view of a portion of the apparatus illustrating the position of the chute in the case where directional orientation of all cut fibres is desired.

With reference to FIGS. 2, 6 and 7, it will be seen that the chute arrangement is secured to mounting plates 20 via a bracket 62, the latter being provided with slots 64 therein thus permitting the position of the bracket 62 and the attached chute to be adjusted somewhat. The bracket 62 is provided with three outwardly projecting studs 64 upon which the chute 60 is mounted. Each stud 64 is provided with a conically shaped coil compression spring 66, such springs 66 being interposed between the body of the bracket and the vertically disposed backing plate 68 forming a part of the chute. The outer ends of the three studs 64 are each provided with an adjustment nut 70 and it can be readily seen that by rotating nuts 70 clockwise or counterclockwise, the backing plate 68 of the chute can be drawn inwardly toward the body of the bracket 62 or rotated somewhat angularly relative thereto as illustrated in FIG. 10. This provides a convenient means of adjusting the position of chute 60 relative to mounting plate 20.

The chute 60, in addition to the vertically disposed backing plate 68, includes a shallowly convexly curved guide plate 72 which is welded to backing plate 68 at right angles thereto. When the chute assembly 60 is properly adjusted relative to the mounting plate 20, a portion of the convexly curved upper surface of guide plate 72 lies in or just slightly below the previously mentioned tangent line T. The primary function of chute arrangement 60 is to guide the fibres being emitted from nip 30 into the path of contact fingers 42. If the chute arrangement 60 is omitted altogether, the apparatus will still function, although with reduced efficiency, but one of the problems that arises is that in some cases continuous fibre rovings, by virtue of the twist therein, tend, immediately prior to cutting, swing inwardly toward the mounting plate 20. Some of these fibres will move inwardly toward mounting plate 20 to such an extent that they are not contacted at all by the fingers 42 but, rather, simply by-pass fingers 42 in the narrow region existing between the free ends of fingers 42 and the surface of mounting plate 20. This undesirable effect is overcome, as illustrated in FIG. 10, by rotating adjustment nuts 70 so that the chute arrangement 60 is angled around relative to mounting plate 20 thereby to bring all of the fibres passing along tangent line T into the path of the contact fingers 42. Another desirable effect of chute arrangement 60 is that it provides for better control of the flight path of the cut fibres after they have been struck by contact fingers 42. While adequate parallel orientation of fibres can be obtained without chute 60 in position, it has been found, in the absence of the chute, that some of the fibres will deviate from the desired flight path with the result being that they are laid down on the mould surface in a somewhat staggered array whereas, in fact, it is desirable to lay the fibres down in generally co-extensive relationship to one another.

Figure 11:
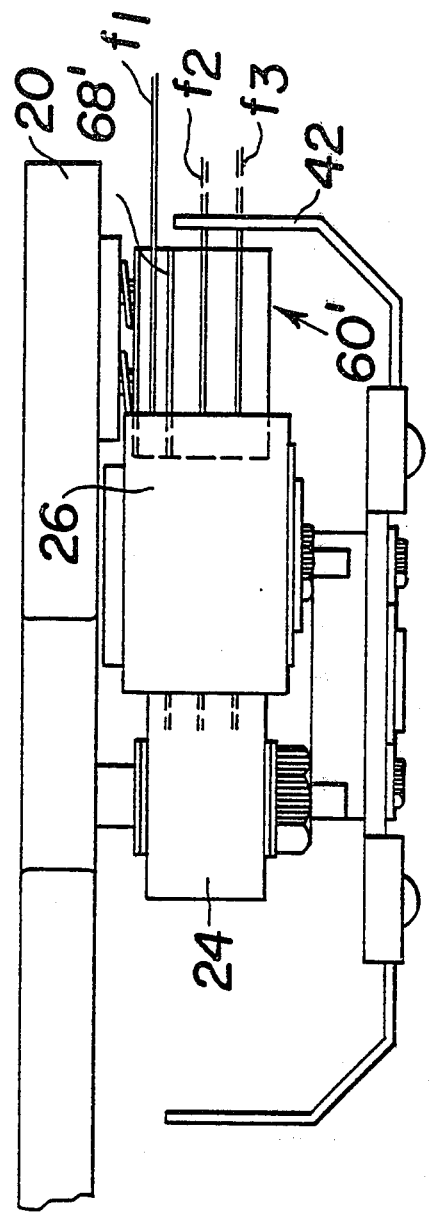
FIG. 11 is a view similar to that of FIG. 10 and illustrating the use of the modified chute arrangement positioned to effect directional orientation of only a portion of the cut fibres.

A modified chute arrangement 60' is illustrated in FIGS. 8, 9 and 11. The modified arrangement is very similar in principle to that described above except that it includes a modified form of vertical plate arrangement 68' which differs from the backing plate 68 described in connection with the basic arrangement. This vertical plate 68', as best seen in FIG. 8, is connected to the guide plate 72 at an intermediate location relative to the transverse dimension of such guide plate. The function of the modified chute arrangement 60' is best illustrated with the reference to FIG. 11. It will be seen here that three fibres F1, F2 and F3 are being emitted from the cutting device. However, fibre F1 passes behind the vertical plate 68' and passes along the tangent line T in the region between the mounting plate 20 and the free end of contact finger 42. Thus, fibre F1 is not struck by fingers 42 and thus it is emitted from the device in random flight pattern and will ultimately be deposited on the mould surface in random orientation. However, the vertical plate 68' positively directs fibres F2 and F3 into the path of the contact fingers 42 with the result being that these two fibres are struck by the finger thus imparting to them the desired flight pattern. It will be apparent to those skilled in the art that by varying the position of vertical plate 68 relative to guide surface 72, and by varying the overall number of individual strands being fed through the cutting apparatus, that the percentage of cut oriented fibres to cut-non-oriented fibre being deposited on the mould surface can be varied somwhat. In the specific arrangement of FIG. 11, one-third of the cut fibres will be deposited in a non-oriented array on the mould surface with the remaining fibres being deposited in oriented fashion.

The operation of the apparatus will now be described with particular reference to FIGS. 12A through 12E and FIG. 13. It will be assumed here that chute arrangement 60 is being used and that all of the cut fibres are being oriented.

Figure 12A:
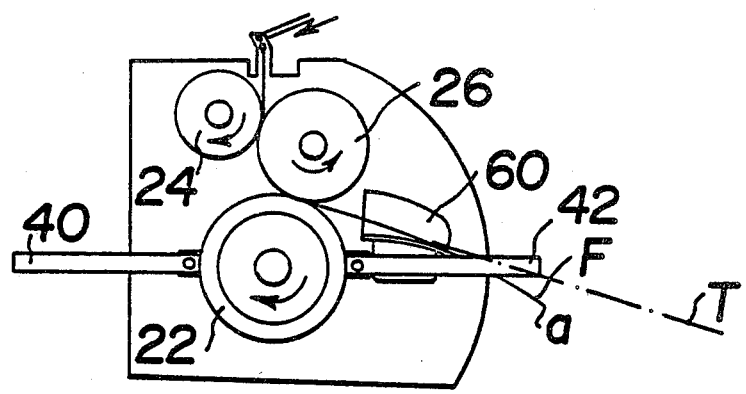
FIGS. 12A through 12E are diagrammatic views of the head assembly illustrating the manner in which the revolving contact arm interacts with the cut fibres thereby to cause same to assume a selected repeating motion pattern in flight.

With reference to FIG. 12A it will be seen that a fibre F is passing outwardly from the nip between cutter roll 22 and pinch roll 26 and that it has moved over the guide surface provided by chute 60 and that its leading end, a, has just moved into the path P defined by the moving contact finger 42. Finger 42, moving in the clockwise direction, has not yet contacted the leading end portion of fibre F.

Figure 12B:
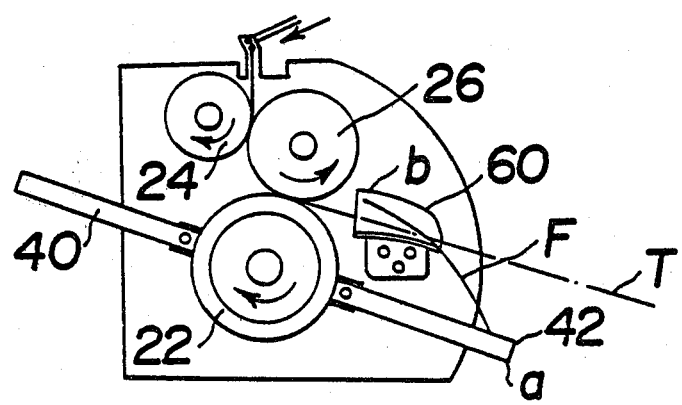

With reference to FIG. 12B it will be seen that the contact finger 42 has come into contact with the leading end portion of fibre F and that the fibre has been drawn downwardly and somewhat around the guide surface provided by chute 60. The trailing end b of the fibre has cleared the nip between the cutter and pinch rolls 22, 26 respectively. The fibre F has thus been made to deviate from its initial path of flight along tangent line T.

Figure 12C:
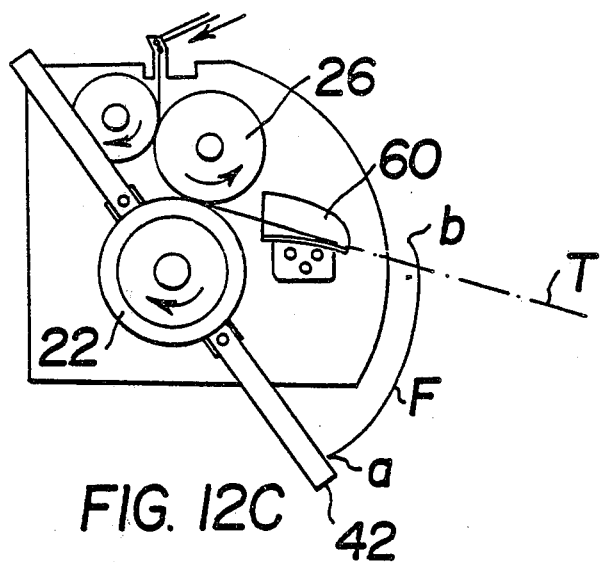

With reference to FIG. 12C it will be seen that the contact finer 42 has moved around still further in the clockwise direction carrying the leading end a of fibre F with it and it will be seen that the trailing end b of the fibre has cleared the chute arrangement 60. By virtue of the forces acting on fibre F, a substantial amount of angular and downward momentum has been imparted thereto and it is now beginning to rotate end over end about its mid-length portion.

Figure 12D:
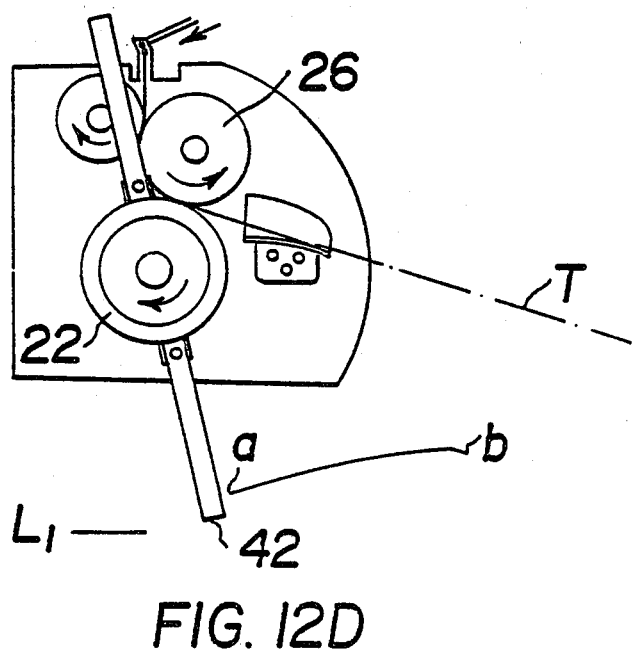

With reference to FIG. 12D, the contact finger 42 has moved still further in the clockwise direction and the finger 42 has just cleared the leading end a of the fibre. The fibre continues to rotate in the clockwise direction and downward and it will be seen that the fibre is now approaching a generally horizontal position.

Figure 12E:
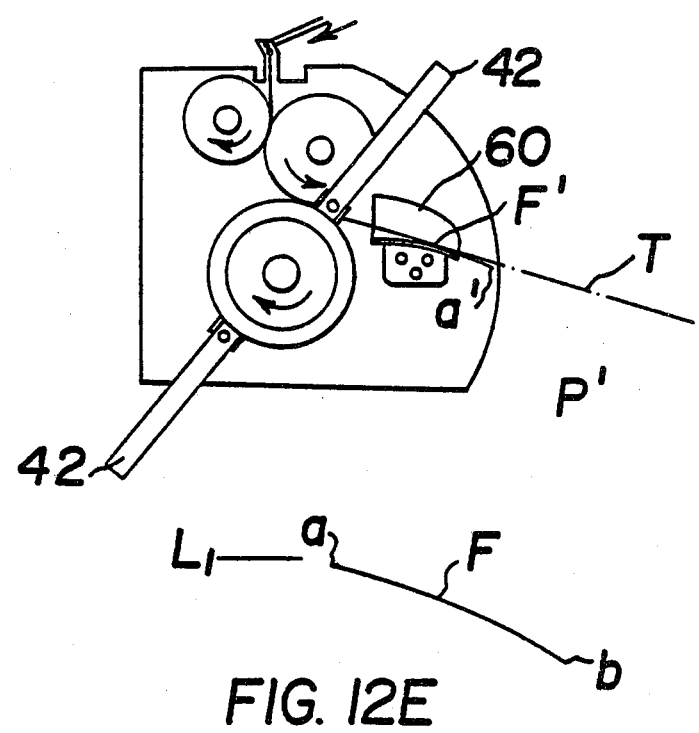

With reference to FIG. 12E, the contact finger 42 has now moved well past the end a of the fibre and as the rotation of the fibre continues, it will be seen that the fibre F has now rotated somewhat past the horizontal position. During the time that the above described actions have been occurring, a further fibre F' has been moving along the tangent line T and, as shown in FIG. 12E, its leading end a' is now approaching the path of travel P of finger 42 of the other arm of the apparatus. The same action will occur with respect to fibre F' as has been described above.

Figure 13:
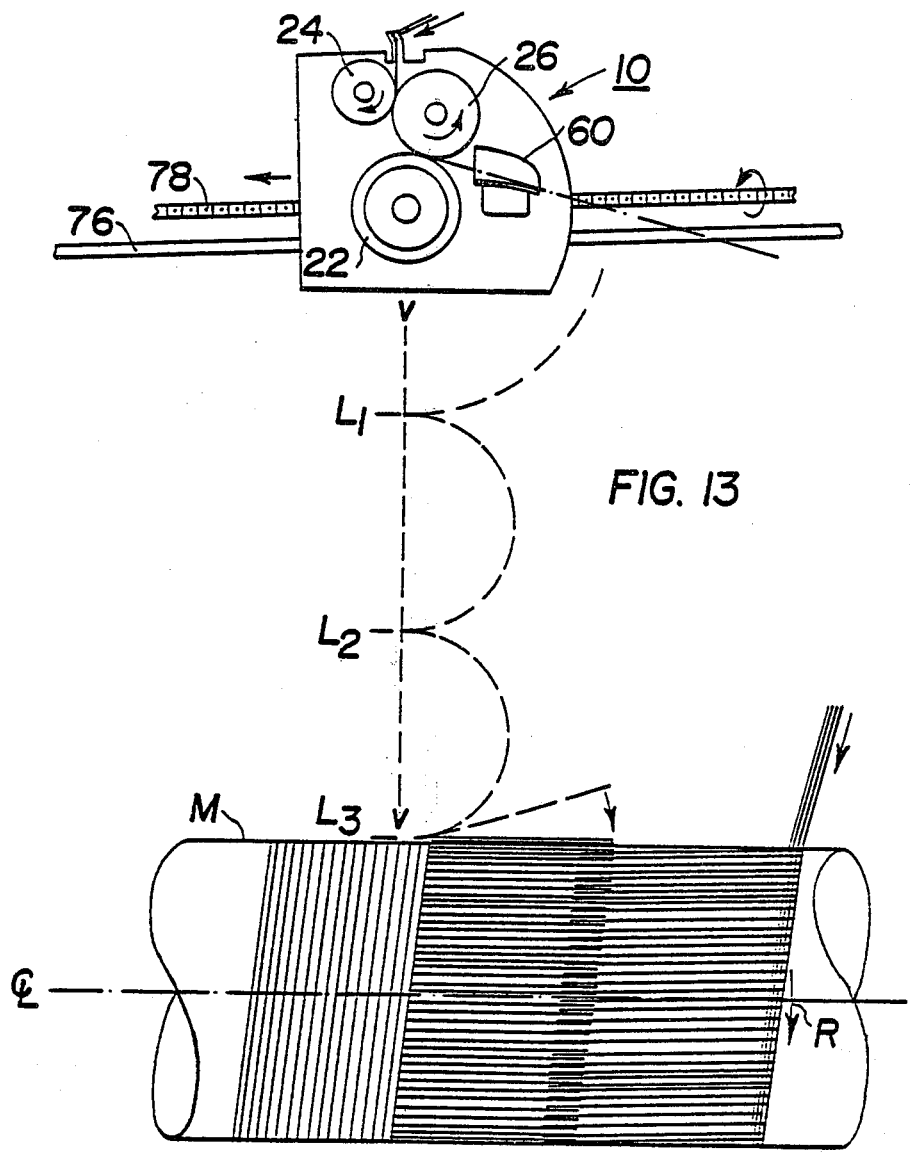
FIG. 13 is a further somewhat diagrammatic representation of the apparatus illustrating the repeating flight pattern of the fibre as it passes downwardly from the head assembly on to the surface of a mould.

FIG. 13 illustrates the repeating motion pattern in flight assumed by the fibres as they move from the cutting and orienting head 10 downwardly toward the surface of the mould M. Since the fibre is rotating end over end about an imaginary axis transverse to its length dimension and located at its mid-length portion as it moves toward the mould surface, the fibre passes through a plurality of levels L1, L2, etc., with the fibre being essentially parallel to the mould surface at the instant in time when it passes through each of such levels. It has been found that by positioning the mould surface M so that it is located at one of these levels, that parallel orientation of the fibres on the mould surface is obtained. A photograph taken with multiple flashes when the apparatus is in operation will readily show the fibre flight pattern and the various levels L1, L2 etc. If the mould surface M is positioned too far below the cutting and orienting head 10, air friction effects will cause the fibre to lose its angular momentum and thus gradually assume a random flight pattern with the result being that parallel orientation cannot be obtained. It has been found, quite surprisingly, that the fibres, by virtue of their angular momentum as they move into these levels at the mould surface, tend to "snap" downwardly quite firmly onto the mould surface and thus embed themselves in any resinous material which has been placed on such surface.

The mandrel M illustrated in FIG. 13 is shown as being of circular cross-section and is rotatable about an axis which is parallel to the parallel fibres being deposited thereon. Thus, as mandrel M is rotated in the direction of arrow R, an annular layer of oriented fibres is built up on the mandrel surface. Relative motion between the fibre cutting and orienting head 10 and the mandrel M is effected along the rotation axis of the mandrel, e.g. head 10 may be mounted on support rail 76 and moved along by a rotating lead screw 78 thereby to apply a plurality of overlapping convolutions of oriented fibres on the mandrel surface. Those skilled in the art will appreciate that a plurality of layers of reinforcing materials may be built up on the mandrel. For example, in many cases, the first layer applied to the mandrel will be a layer of hoop-wound continuous length filaments, suitably saturated with a resin, following which a layer of the longitudinally oriented filaments may be deposited. Following this, a further layer of hoop-wound filaments may be wound on the mandrel, with such process being continued until the desired wall thickness has been achieved. As noted previously, the modified chute arrangement 60' may be used so that in addition to the longitudinally oriented filaments, a certain percentage of randomly oriented filaments are laid down on the mould surface. In addition, conventional means (not shown) may be employed in order to supply various filler materials, such as sand, to the rotating mandrel thereby to provide the final product with the desired structural characteristics. The mandrel need not be of a strictly cylindrical shape but may have a tapered shape as, for example, when it is desired to manufacture utility poles such as light standards and the like. The mould need not be of circular cross-section as the principles of the invention are applicable to the deposition of oriented fibres on any suitable mould surface, including flat surfaces.

Since the invention eliminates the need for carrier tapes and the like in order to maintain the orientation of the fibres as they are laid down on the mould surface, it will be appreciated that the adjacent cut length of fibres are devoid of any interconnecting filaments extending therebetween. In other words, the interconnections between the cut fibre lengths are provided solely by the matrix of plastics materials.

The preferred plastic matrix materials will be well known to those skilled in the art and may include such thermosetting resins as phenol-formaldehyde, melamine-formaldehyde, polyester epoxy and thermoplastic resins such as polyesters, polyvinyl acetates and polystyrene.

The apparatus described above is capable of orienting a wide variety of lengths of fibres. Cut fibre lengths between four and five inches long provide excellent results. Tests have been carried out with the apparatus arranged so as to utilize fibre lengths as short as one to one and one-half inches long. However, with such short fibre lengths, there is greater difficulty in obtaining the desired motion pattern in flight and thus, with a shorter length fibre, some fall-off in accuracy of orientation can be expected. For the apparatus described above, where the forces are being applied to each cut fibre at a point closely adjacent its leading end as it passes along the tangent line T, the effective length of the arm 40 i.e. the radius of the path of travel of the contact finger 42, will be approximately equal to the cut fibre length. In addition, as noted above, the cutter blade will lag its associated arm by a suitable angular amount to permit the cut fibre to move out along the tangent line a suitable distance before the leading end portion thereof is struck by the contact finger 42.

The apparatus is capable of operating effectively over a wide range of speeds. For example, in the cutting and orienting of 4.5" long fibre, the apparatus was operated successfully with cutter wheel speeds ranging from about 200 rpm to over 2500 rpm. Of course, if the cutter wheel is rotated at a very slow speed, the speed of travel of the contact fingers 42 will not be sufficiently great as to impart to the cut fibres the necessary dynamic forces as to create the desired motion pattern in flight. It is quite apparent, however, that the apparatus is capable of operating successfully over a wide speed range and those skilled in the art can readily determine the most suitable speed ranges to be used for any given set of circumstances.

Insofar as the fibrous material tested to date is concerned, glass fibre was used because of its high strength, low cost, and ready availability. A typical example of a suitable commercially available glass fibre roving is the 225 yards per pound variety. Since such material is in common usage in reinforced plastics fabrications it need not be described further here.

Figure 14:
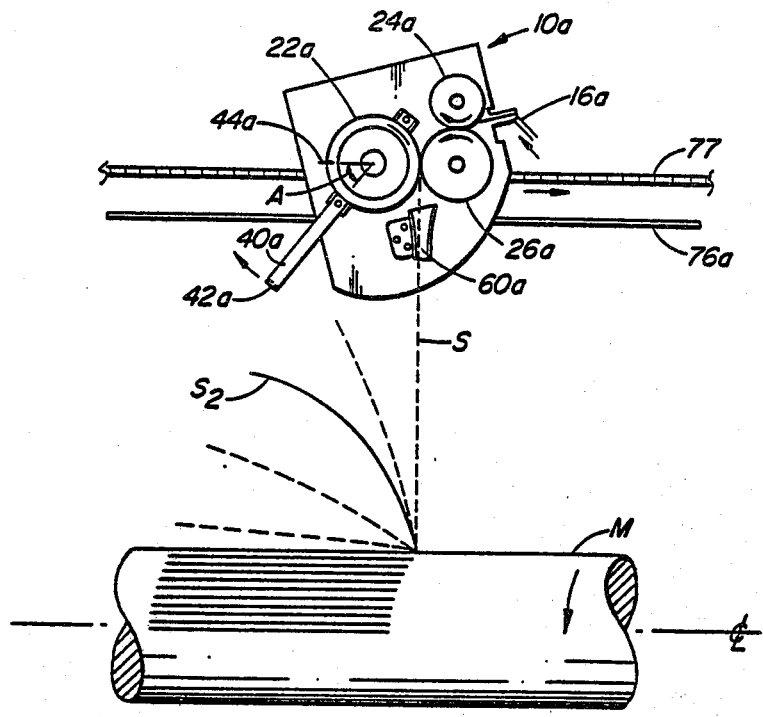
FIGS. 14-17 illustrate additional embodiments of the invention.
Figure 15:
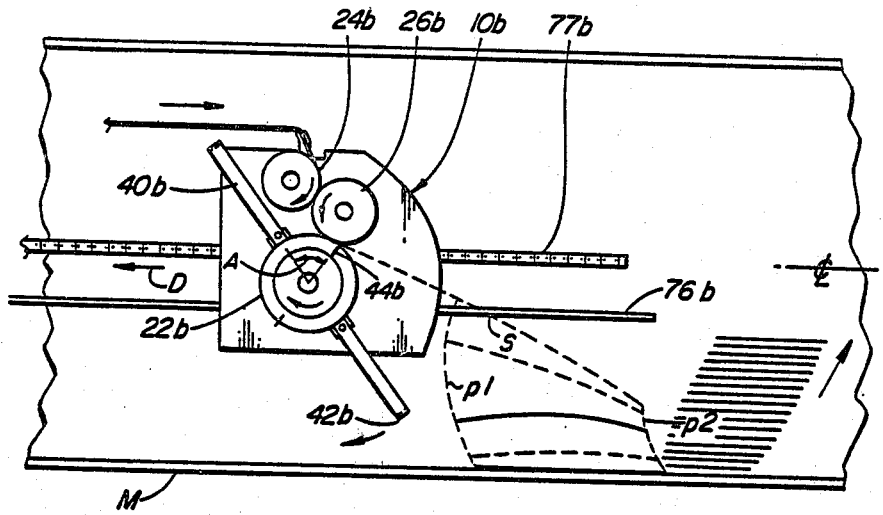
Figure 16:
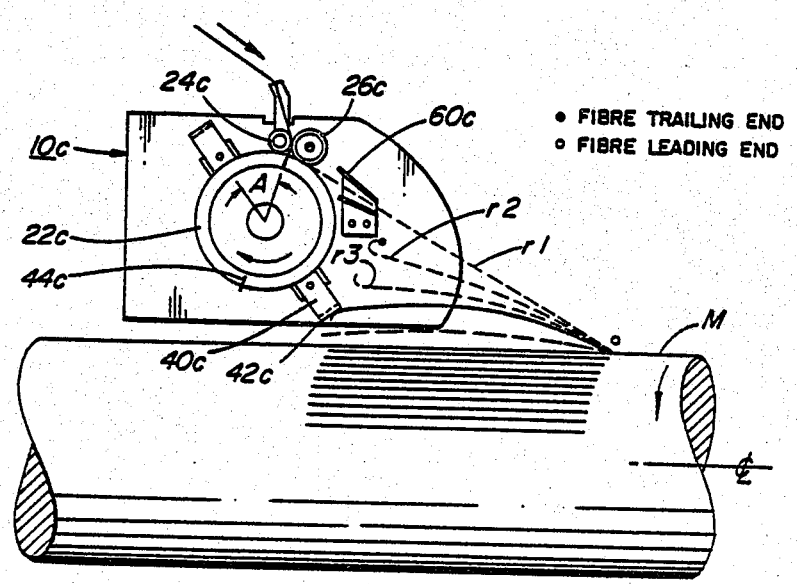

FIGS. 14–16 illustrate additional embodiments of the invention. The embodiment of FIG. 14 is closely related to the embodiments of FIGS. 1–13 and like parts have been given the same reference numbers with the suffix "a" added thereto. The FIG. 14 embodiment is used when it is desired to cut and orient relatively long fibres e.g. fibres 9¼ inch long. These long fibres must exit downwardly (ie. the initial path of travel has a large vertical component) as the chute 60a cannot support and guide a long fibre accurately when head assembly 10 is arranged as in FIG. 1. Accordingly, the head assembly 10a is shown as being rotated clockwise from the FIG. 1 position by a relatively large angle (eg. about 75°) so that chute 60a is directed downwardly toward the mould surface defined by mandrel M. It will also be noted that the cutter roll 22a has only a single blade thereon with the cutter roll also carrying only a single striker arm 40a. The angle A between the cutter blade 44a and the striker arm 40a is chosen such that the contact finger 42a engages the trailing end portion of each cut fibre shortly after it clears the chute 60a at the strike point S. The manner in which this angle can be adjusted to yield the desired effect has been described previously with reference to FIG. 2. The contact finger 42a clears the end of the fibre at point S2. The fibre, whose lower end has by this time virtually reached the mould surface continues by virtue of its angular momentum to rotate about an imaginary axis transverse to its length and close to its lower end until it strikes the mould surface and becomes adhered thereto by the uncured resin on the mould and in parallel relation to the other fibres previously deposited thereon as described earlier. The mandrel M rotates about its axis LC while at the same time the head assembly 10a is moved along support rail 76a by means of a drive chain 77 at a predetermined rate of travel related to the rate of rotation of mandrel M and the rate of deposition of the cut fibres on the mould surface. In this way overlapping convolutions of oriented fibres are built upon the mould surface.

The embodiment of FIG. 15 again is very similar to the embodiment of FIG. 13 for example and like components bear like reference numerals with the suffix "b" added thereto. In this case the mandrel M is in the form of a hollow cylinder of circular section and the head assembly 10b is arranged for travel on support rail 76b within such cylinder along the rotation axis LC thereof in the direction of arrow D. This arrangement is useful for manufacturing tubular reinforced bodies such as conduits, light standards the like. The cylinder may also be tapered along its length in the case where light standards are being manufactured. (It might also be noted at this point that the embodiments of FIGS. 1–13 can also be set up to cut and orient fibre on the interior surface of a cylindrical mould, in which event fibre deposition will usually occur at the L1 level). In the FIG. 15 embodiment the angle A between the cutter blades and the striker arms 40b is such that contact fingers 42b strike the trailing end of each cut fibre at point S located on the tangent line extending from the nip between rolls 22b and 26b. (In this arrangement a chute to direct the fibre is not required.) The fibre then rotates a small portion of one revolution about an axis transverse to its length with the trailing and leading ends of the fibre following the general paths shown in dashed lines as p1 and p2 until the mould surface is reached. The head assembly is continually moved in the direction of arrow D so that the landing position of the fibre is behind the head assembly 10b. A layer or layers of oriented fibres are thus built upon the resin coated mould surface.

Up to this point, the specific embodiments described have all been arranged such that the fibre passes or moves in a flight path, a portion of such flight (in some cases a very small portion) being in the form of "free flight" ie. flight wherein the fibre moves under the influence of its own momentum, gravitational and air friction effects. The following embodiments differ from the foregoing ones in that they do not allow for any "free flight" of the fibre at all; that is, the fibre is in contact with one or more parts of the apparatus over the course of its entire path of flight or travel between the head assembly and the mould surface. The above feature will be evident from an inspection of FIGS. 16 and 17.

Referring to FIG. 16 the cutter wheel 22c is shown as being equipped with the usual striker arms 40c. The blades 44c on the cutter wheel 22c are angularly located in relation to arms 40c (by effecting the adjustments described in connection with FIG. 2) and the surface of the mould M is located sufficiently close to head assembly 10c that the leading end of the fibre reaches the mould surface just before its trailing end is struck by the contact finger 42c on the associated striker arm 40c, the limiting factor here being that the path of movement of the striker arms must clear the mould surface by at least a short distance. In a typical example, the arc of the contact fingers passes about ¼ inch beyond the outlet end of the chute 60C and strikes the fibre about ⅜ inch from its trailing end. The principle involved is the same as that associated with the other embodiments described, the only difference being that the fibres' path of flight is such that the fibre is in contact with either:

(a) the chute 60C;

(b) the chute 60C (at trailing end) and resin coated mould surface (fibre leading end)—see position r1;

(c) the contact finger 42a (at trailing end) and resin coated mould surface (leading end)—see position r2;

(d) the resin coated mould surface (leading end)—see position r3, in that order before the full length of the fibre lands in its final oriented position on the resin coated mould surface. Thus it will be seen that the principles of the invention still apply fully even when the fibre is under some form of physical restraint during its entire flight path between the head assembly 10C and the mould surface. The embodiment of FIG. 16 can of course be used with the hollow cylinder type of mould shown in FIG. 15 as well as with other types of moulds both flat and curved.

Figure 17:
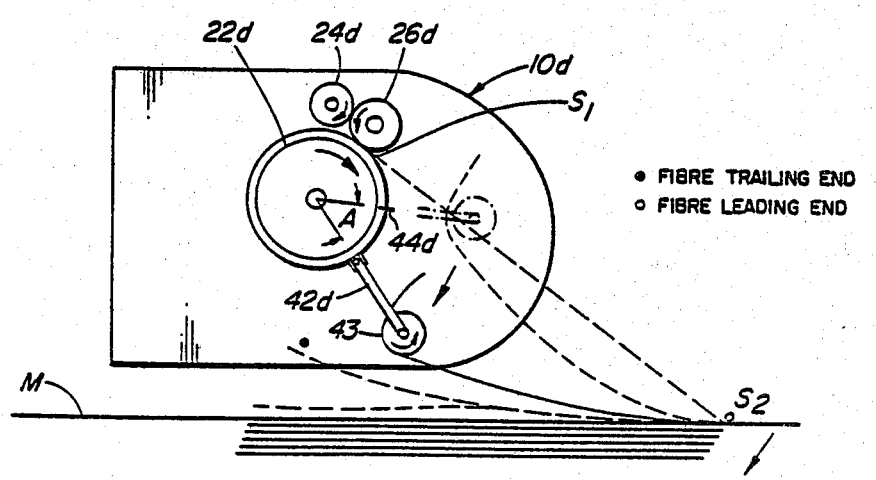

FIG. 17 illustrates a variant of the arrangement shown in FIG. 16. This variant does not require the use of the chute. The blade 44d is angularly arranged relative to striker arm 42d such that the fibre is cut by the blade and then immediately hit by a small free wheeling roller 43 attached to the end of striker arm 42d. The circumference of cutter roll 22d equals the length of the cut fibre ie. the straight line distance from point S1 at the cutting point to point S2 on the resin coated mould surface. As the striker arm 42d rotates, the fibre, with its free end engaged with the mould surface, is progressively drawn around into parallelism with the mould surface, with roller 43 rotating so as to avoid wrapping or snarling of the fibre thereabout. Roller 43 is free running, eg. journalled on ball bearings, and of low inertia for best results. In the last phase of its movement, the angular momentum imparted to the fibre causes it to snap into full length contact with the resin coated mould surface.

It will therefore be appreciated that the embodiment of FIG. 17 eliminates all free flight of the fibre. It is in contact with the mould surface at the time it is cut and remains in contact with the mould surface as it is progressively laid down on such surface by the action of the striker arm 42d and roller 43.

The above-described embodiments serve to illustrate that the cut fibres can have many different forms of motion pattern as they travel between the cutter and the mould surface. Those skilled in this art will, in the light of the above disclosures, be able to visualize various modifications to the motion patterns described above and to devise means for providing such modified forms of motion patterns while still remaining within the spirit and scope of the invention as set forth in the appended claims.

We claim:

1. A method of applying fibre reinforcing material to a mould surface, said method comprising: passing a strand of continuous length fibre through a cutting device to cut the strand into generally uniform length cut fibres; directing cut fibres endwise away from the cutting device along an initial path of travel; applying a force at a predetermined location along the length of the individual cut fibres to cause the individual cut fibres to deviate from the initial path of travel and to assume a selected motion pattern, and positioning a mould surface so as to intercept the moving cut fibres at a selected phase of the motion pattern to achieve a predetermined orientation of the cut fibres on the mould surface.

2. The method of claim 1 wherein said force is applied to the individual cut fibres adjacent an end portion thereof.

3. The method of claim 2 wherein said force is applied to the individual cut fibres in such manner as to cause each cut fibre to rotate about an imaginary axis transverse to its length during the course of its selected motion pattern and to cause the cut fibres to be deposited on the mould surface in generally parallel orientation to one another.

4. The method of claim 1, 2 or 3 wherein said force is applied to the individual cut fibres by contacting each of them with a moving contact element.

5. The method of claim 4 wherein said contact element is moved in an arcuate path during at least the time that it is in contact with the cut fibre.

6. The method of claim 4 wherein the continuous length fibre is passed through the nip defined between a bladed cutter roll and a pinch roll contacting the same to cut the fibres into said uniform lengths, with said initial path of travel being along a line tangent to the contacting surfaces of the cutter and pinch rolls in the nip, and wherein said contact element is moved in a circular path centered at the rotation axis of one of said rolls and in synchronism with the rotation of such roll.

7. The method of claim 1, 2 or 3 wherein said selected motion pattern comprises rotation of the cut fibres about their mid length portions in such fashion that if not intercepted by said mould surface they would rotate end over end in free flight through a series of spaced parallel positions; said step of positioning the mould surface comprising locating the mould surface at and in generally parallel relation to one of said parallel positions whereby the cut fibres are intercepted by and deposited on the mould surface in generally parallel orientation relative to one another.

8. The method of claim 1, 2 or 3 wherein the mould surface is defined by a mandrel of circular cross-section, said method further comprising applying uncured resin to said surface, and rotating the mandrel about its axis with such axis being in the general direction of the parallel fibres being deposited thereon to build up an annular layer of oriented fibres on the mandrel surface, and effecting relative motion between the cutting device and mandrel along the rotation axis of the mandrel to apply a plurality of overlapping convolutions of oriented fibres on the mandrel.

9. The method according to claim 1, 2 or 3 wherein a further strand of continuous length fibre is passed through said cutting device along with the first mentioned strand with said force being applied only to the individual cut fibres of the first mentioned strand whereby the cut fibres of the further strand assume random flight patterns and are deposited on the mould surface in random orientations, the mould surface having uncured resin thereon to which said fibres adhere.

10. The method according to claim 1, 2 or 3 wherein said mould surface has uncured resin thereon to which said cut fibres adhere after deposition thereon.

11. Apparatus for applying fibre reinforcing material to a mould surface comprising: means including a cutting device for cutting a strand of continuous length fibres into lengths and directing cut fibres endwise away from the cutting device along an initial path of travel; and means for applying a force at a predetermined location along the length of the individual cut fibres to cause the latter to deviate from the initial path of travel and to assume a selected motion pattern, whereby a mould surface may be positioned so as to intercept the moving cut fibres at a selected phase of the motion pattern to achieve a predetermined orientation of the cut fibres on the mould surface.

12. Apparatus according to claim 11 wherein the force applying means is adapted to apply said force to the individual cut fibres adjacent an end portion thereof.

13. The apparatus of claim 12 wherein said force applying means is adapted to apply such force to the individual cut fibres in such manner as to cause each such individual cut fibre to rotate about an imaginary axis transverse to its length during the course of its selected motion pattern and to cause the cut fibres to be deposited on the mould surface in generally parallel orientation to one another.

14. The apparatus of claim 13 wherein said force applying means comprises a contact element adapted to engage each said cut fibre adjacent one of its opposing ends to cause each such cut fibre to deviate from the initial path of travel.

15. The apparatus of claim 14 wherein said contact element is mounted for movement in an arcuate path during at least the time that it is in contact with the cut fibre.

16. The apparatus of claim 14 wherein the cutting device comprises a bladed cutter roll and a pinch roll contacting the same to define a nip through which the continuous length fibre is passed to cut the fibre into said lengths, with said initial path of travel being along a line tangent to the contacting surfaces of the cutter and pinch rolls in the nip, and wherein said contact element is mounted to an arm arranged for movement in a circular path centered at the rotation axis of one of said rolls and in synchronism with the rotation of such roll.

17. The apparatus of claim 13 or 14 or 15 or 16 in combination with means defining the mould surface to effect said interception of the fibres at said selected phase of the motion pattern.

18. The apparatus of claim 17 wherein, in operation, the cut fibres move generally toward the mould surface while rotating about their mid-length portions in such fashion that if not intercepted they would rotate end over end in free flight through a series of spaced parallel positions, said mould surface being located to intercept the cut fibres as they rotate to one of the spaced parallel positions whereby the cut fibres are deposited on the mould surface in generally parallel orientation relative to one another.

19. The apparatus of any one of claims 13 to 16 including means defining a mould surface of circular cross-section adapted to have uncured resin applied thereto when in use, said apparatus further comprising means for rotating the mould surface about its axis with such rotation axis being at least approximately parallel to the parallel fibres being deposited thereon to build up an annular layer of oriented fibres on the mould surface, and means for effecting relative motion between the cutting device and the mould surface along the rotation axis of the latter to apply a plurality of overlapping convolutions of oriented fibres on the mould surface.

20. The apparatus of claim 11 or 12 in combination with means defining the mould surface to effect said interception of the fibres at said selected phase of the motion pattern.

21. The apparatus according to any one of the claims 11 to 16 further adapted to pass a further strand of continuous length fibre through said cutting device along with the first mentioned strand, and means cooperating with the force applying means such that said force is applied only to the individual cut fibres of the first mentioned strand whereby the cut fibres of the further strand assume random motion patterns and are deposited on the mould surface in random orientation.

* * * * *